(No Model.)
C. STONER & S. B. WELCH.
NECK YOKE BAR.
No. 370,662. Patented Sept. 27, 1887.
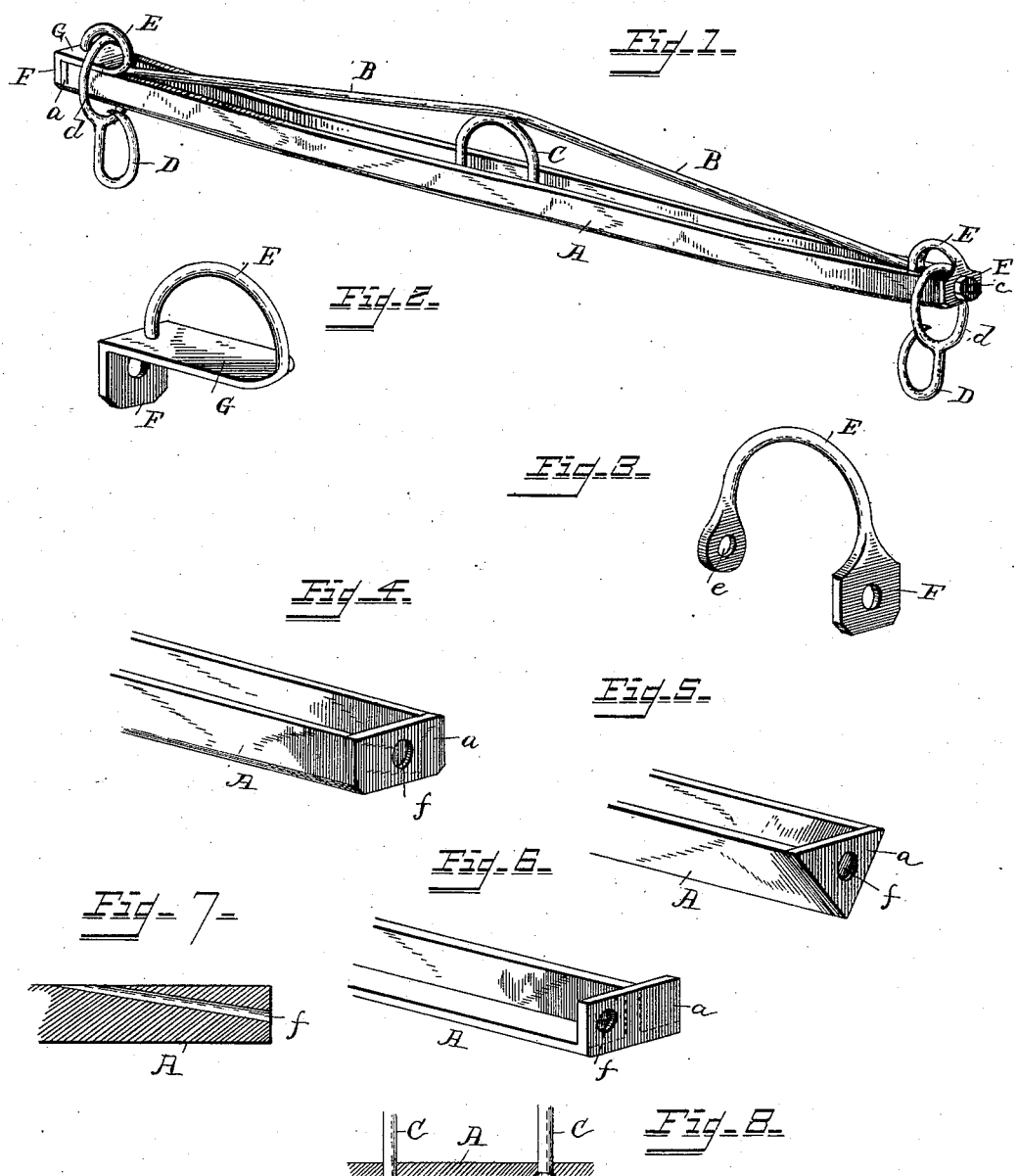
Witnesses
Albert Snyder
Alfred T. Gage
Inventors
Charles Stoner & Simon P. Welch
By their Attorney
R. T. Henderson

UNITED STATES PATENT OFFICE.

CHARLES STONER AND SINKIN B. WELCH, OF MONTPELIER, OHIO.

NECK-YOKE BAR.

SPECIFICATION forming part of Letters Patent No. 370,662, dated September 27, 1887.

Application filed June 18, 1887. Serial No. 241,762. (No model.)

*To all whom it may concern:*

Be it known that we, CHARLES STONER and SINKIN B. WELCH, citizens of the United States, residing at Montpelier, in the county of Williams and State of Ohio, have invented certain new and useful Improvements in Neck-Yokes and Whiffletrees; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

Our invention relates to improvements in whiffletrees, doubletrees, neck-yokes, and the like, and has for its object to simplify, cheapen and lighten the device, and to give it increased strength and durability; and to such ends the invention consists in the construction and the combination hereinafter particularly described and claimed, reference being had to the accompanying drawings, forming a part hereof.

Figure 1 is a perspective of a whiffletree. Fig. 2 is a perspective of one form of clip; Fig. 3, a perspective of another form of clip. Figs. 4, 5, 6, and 7 are perspectives of different forms of bar that may be used; Fig. 8, a section of bar and lower ends of bridge, showing one method of uniting bridge to bar.

The letter A designates the main portion or bar of the tree or yoke, made from iron, steel, or other suitable metal. It is in cross-section of the form of angle or T iron or similar construction, having one or more flanges at an angle to another, so as to impart lightness and at the same time strength to the tree or yoke. One of the flanges at the ends of the main portion or piece is cut away, or one extended farther than the other, as illustrated, so as to form a lip, which may be bent at an angle to the length of the main portion to form a lug or lip, $a$, for the passage therethrough of the brace-rod, each lug or lip being formed with a hole, $f$, for the brace-rod.

The brace-rod B, which is preferably a steel rod, has welded thereto or otherwise formed integral therewith a bridge, C, which also forms a clip or clevis for the attachment of the tree or yoke to whatever it is to be connected. By forming the bridge and clevis integral with the brace-rod the double function mentioned is performed and strength and rigidity added to the parts. The bridge or clevis may simply bear against the main portion or bar of the tree or yoke, if the nuts on the brace-rod be drawn tight enough to hold it to place; but the best construction is to pass a part of the bridge, or preferably its two ends, through or around the main portion or bar of the tree, and then apply nuts $b$ to the ends to hold the bridge to the bar, or apply a nut to one end and rivet-head the other, as shown. The brace-rod is further secured to the main portion or bar by passing its threaded ends through the lips $a$, and applying nuts $c$ to the ends thereof, so that by screwing up the nuts the tension of the brace-rod can be increased at will, and thus stiffen the main portion or bar to suit the strain on the tree.

Hooks D are applied to the main portion or bar of the tree, and secured thereto in any suitable way, and are for the hitching or attachment of the traces or power to the tree or yoke. The hook has a loop, $d$, which fits over the end of the bar, and is secured in place, say, by clips or staples E, which cross the loop, and may be secured to the bar or main portion in any suitable way. The preferred construction of clip is to form it with a washer, F, at one end to fit between the nut $c$ and end of the main bar. The other end of the clip may be formed with an eye, $e$, for the passage of the rod B, so that there will be no danger of the loop slipping from off the bar; or it may terminate on top of or pass through a plate, G, which may extend from the washer F to one end of the clip, as shown in Fig. 2. This plate is not essential, as shown in Fig. 3. The connection of the clip to the rod B by the eye $e$, or to the plate G, is preferred, as it makes the fastening more secure; but still it is not absolutely necessary.

Fig. 7 illustrates the bar A as formed solid, with the hole extended through it for the passage of the rod B.

When the washer F is employed, the lip $a$ might be omitted; but it is considered best to employ it.

We have described the best means for constructing the tree or yoke according to our invention; but it is obvious that changes in details of the parts can be made without departing from our invention, and that some parts can be used with other forms than those shown and claimed. For instance, the brace-rod with the bridge or clevis can be used with some other form of bar A, and such form of bar A, as shown, can be used with other forms of brace-rod and clevis.

Having described our invention and set forth its merits, what we claim is—

1. The main bar presenting in cross-section flanges at an angle to each other, in combination with a brace-rod, a bridge between the bar and rod, and means for securing the parts together, substantially as described.

2. The main bar formed with lips at opposite ends, the brace-bar passed through said lips, and having adjusting means at their ends, and a bridge interposed between the brace-rod and main bar and bearing against the main bar, substantially as described.

3. A tree or yoke composed of the main bar presenting in cross-section flanges at an angle to each other, a portion of said flanges being bent to form lips, a brace-rod passed through said lips, and means for adjusting the tension of said parts, substantially as described.

4. The combination, with the main bar and brace-rod, and bridge formed integral with the brace-rod and bearing against the main bar, of the washer at the end of the bar, and the nut applied to the rod outside of the washer, substantially as described.

5. The combination, with the main bar and brace-rod, of the hook applied to the bar, the clip straddling a portion of the hook, and formed with a washer extended across the end of the bar, substantially as and for the purposes described.

In testimony whereof we affix our signatures in presence of two witnesses.

CHARLES STONER.
SINKIN B. WELCH.

Witnesses:
CHARLES A. BOWERSOX,
CLINTON PAINE.